United States Patent Office 2,956,717
Patented Oct. 18, 1960

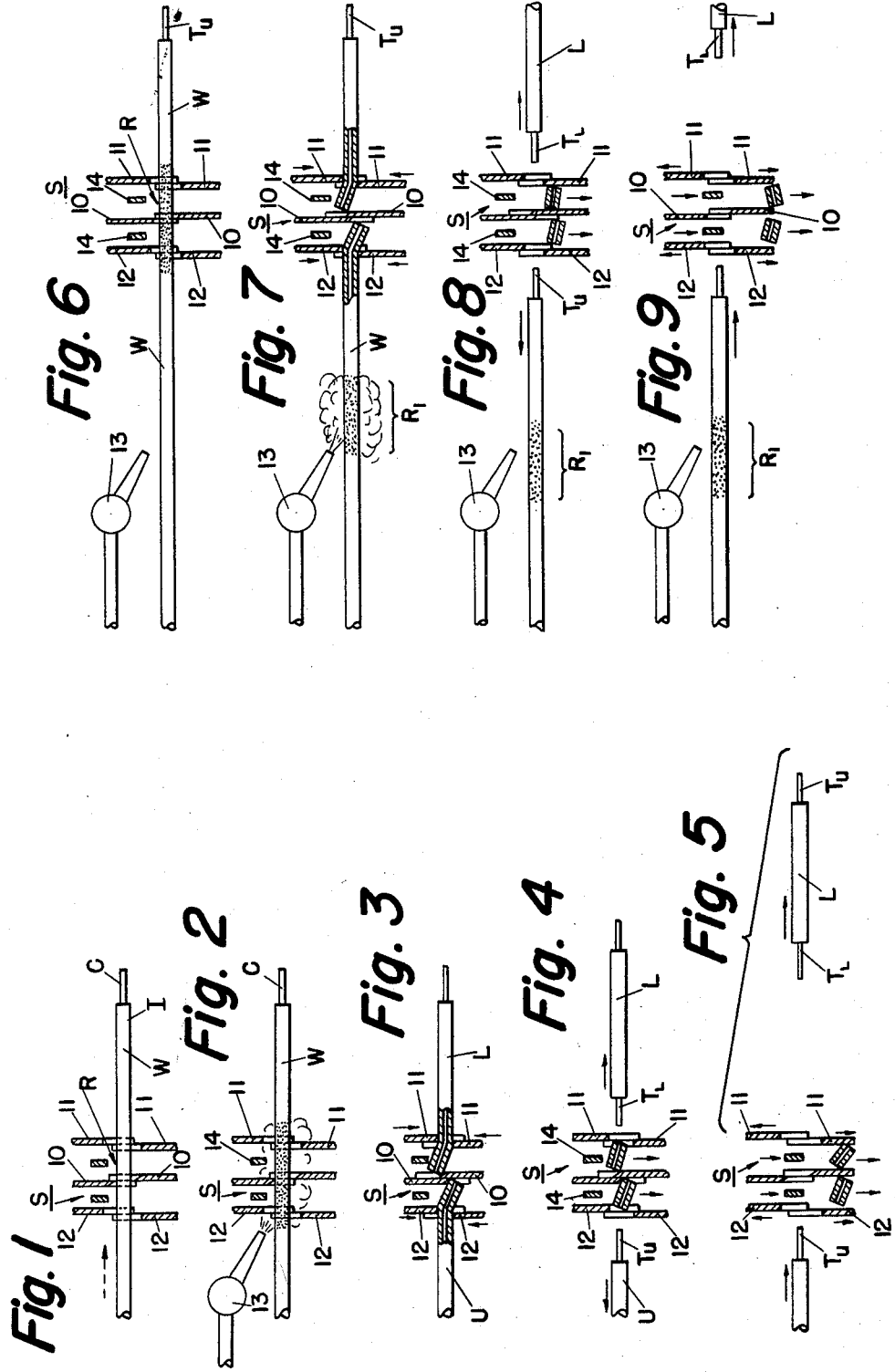

2,956,717

WIRE STRIPPING METHODS AND APPARATUS

Herbert D. Scharf, Philadelphia, Pa., assignor to Jennings Machine Corporation, Philadelphia, Pa., a corporation of Pennsylvania Filed Sept. 26, 1958, Ser. No. 763,724

4 Claims. (Cl. 225—1)

This invention relates to methods and apparatus for stripping insulation from the terminal portions of wire leads.

A common method of removing insulation from a terminal portion of an insulated wire is to make an encircling cut in the insulation at a desired distance from the end of the wire and then to pull off the severed insulation. In practice, it is difficult to cut cleanly through the insulation all around the periphery of the wire without nicking the conductor. If, in avoidance of such nicking, the depth of cut into the insulation is reduced, then it is difficult to strip the insulation without leaving shreds or streaks of insulation. The difficulty in obtaining an unmutilated exposed terminal wire which is clear of insulation is most pronounced when the conductor is multi-stranded wire covered with a coating of tough, stretchable, adherent or tacky insulation, such as extruded Teflon or rubber for example.

In accordance with the present invention, in the production of precut leads from a continuous length of wire intermittently fed to a wire-cutting and stripping station, spaced unbent regions of the wire are successively subjected, at or in advance of such station, to a jet of carbon dioxide, liquid air or other refrigerant to effect localized, temporary embrittlement of the wire insulation in those regions. At such station and in the interval between successive feeding movements of the wire, the wire is cut through to detach a lead therefrom and, substantially concurrently with such cutting, the embrittled insulation on opposite sides of the cut is fractured, as by pressure applied thereto by blunt stripping tools whose motion terminates short of contact with the conductor. The lead and the uncut length of wire are pulled in opposite directions from the cut for removal by said blunt tools of the fractured insulation from the trailing terminal end of the lead and the forward terminal end of the uncut wire. These steps are repeated for successive lengths of the insulated wire stock to provide a series of insulated leads with unmutilated exposed ends which are clear of remnant insulation.

Although not limited thereto, the aforesaid method may be performed by high-speed lead cutting and stripping mechanism, such as shown for example in my earlier Patent 2,756,619, modified by substitution of blunt fracturing tools for insulation-cutting knives and by addition of nozzle structure for directing a jet of refrigerant against the wire at, or suitably in advance of the cutting and stripping station.

For a more detailed understanding of preferred methods and apparatus involving the invention, reference is made in the following description to the attached drawings in which:

Figs. 1–5 illustrate successive steps of a method for producing lengths of hook-up wire having exposed terminal ends which are unmutilated and free of remnant insulation; and Figs. 6–9 illustrate the successive steps of an alternative but generically similar method.

Referring to Fig. 1, the wire W is representative of a conductor C covered with a coating on insulation I. The conductor C may be a single strand or solid conductor or it may be composed of a multiplicity of strands. For hook-up purposes, the conductor is usually copper wire; sometimes coated with a noble metal such as silver. The insulation I may be any of various synthetic or natural rubbers or resins including polyethylenes and fluoroethylene such as Teflon, Kel-F, and the like extruded on the wire or applied as an impregnant to a loose fibrous wrapping or covering of cotton, felted asbestos or the like. For obvious reasons, the invention is not applicable to removal of insulation consisting solely of a wrapped or braided fibrous material since such type of insulation is not cold-hardenable.

As indicated in Fig. 1, the leading end of the wire is fed beyond a wire-cutting and stripping station S to extent corresponding with the desired length of the lead to be cut from the wire. In the particular arrangement shown in Fig. 1, three pairs of reciprocating tools are disposed at the stripping station. The intermediate pair of tools 10 may be a pair of V-notched knives, as in my aforesaid patent, which when separated form an aperture or gap through which the leading end of the wire is fed. The pairs of tools 11 and 12 disposed on opposite sides of the tools 10 respectively at a distance corresponding with the terminal portions of leads to be cut from the wire may also have opposed V-notched edges. However, the edges of the tools 11 and 12, unlike those of tools 10, are blunt. During feed of the wire to the position shown in Fig. 1, the tools 11 and 12, as well as tools 10, are separated, so providing aligned apertures or gaps through which the wire may be fed.

The distance along the wire between the pairs of tools 11 and 12 defines a terminal region R of the wire W from which the insulation I is to be removed. In accordance with the present invention, before any of the insulation in this region is subjected to the action of tools 10–12, it is temporarily embrittled by exposure to extremely low temperature in the range from about −100° to −300° F. As indicated in Fig. 2, the region of insulation between the tools 11 and 12 may be subjected to an atmosphere of carbon dioxide, liquid air or other vapor or gas refrigerant supplied, for example, by one or more nozzle structures 13. For reasons of economy, and to avoid fouling of the tools with frost the supply of refrigerant may be intermittent and timed, by means not shown, to be cut off except for an interval beginning at about the completion of the feeding movement of the wire to station S and terminating at about the time the tools 10–12 move to engage the wire.

In consequence, by the time the tools engage the insulation I, it is in a hard brittle state similar to that of glass or ceramics at room temperature. Thus the pressure exerted by the tools 10–12 upon the insulation as they move towards the position shown in Fig. 3 fractures the insulation and effects its complete clean severance from the insulation to the right of tools 11 and to the left of tools 12. The tools 11 and 12 are so adjusted as to stroke or final position, that the separation between them at the end of their fracturing stroke is less than the thickness of the wire conductor. The stroke or final position of the knives 10 however is such that they shear the conductor C intermediate the ends of the embrittled region (Fig. 3).

Thus upon completion of the "in" stroke of the tools 11–12, a length of lead L (Fig. 3) is detached from the leading end of the wire; the lead L and the uncut length U of the wire extending in opposite directions from the station S.

While the tools are at rest in their "in" position, the lead L and the uncut length U may be moved in opposite directions from the station S (Fig. 4) so that fracturing tools 11 and 12 are effective to strip from the terminal portions $T_L$, $T_U$ any of the fractured insulation which may be left encircling such terminals. Usually when the embrittled insulation is struck by the tools 10–12, all or most of it may shatter and fall clear of station S.

There is the possibility, however, that it may only locally fracture, in effect leaving a short tubular section on one or both of the terminal potrions $T_U$, $T_L$. To insure that the space between the tools is cleared before the next wire-feeding step, there may be provided a pair of ejector tools 14 which, upon completion of the stripping operation, are moved from the position shown in Fig. 4 to that of Fig. 5. Such movement of the ejectors 14 may be effected while the tools 10–12 are being returned to their original positions (Figs. 5 and 1). The ejector tools are thereupon returned to their initial position (Fig. 1).

This completes the successive steps involved in cutting a lead from a continuous length of wire, removing the insulation from the trailing terminal portion of that lead and removing the insulation from the forward terminal end of lead next to be formed. This series of operations is performed upon successive lengths of wire W fed through and beyond the station S. Thus in converting the wire W as fed from a reel or other supply source into leads of desired length, regions of the insulation spaced at intervals corresponding with the lead length are sequentially temporarily embrittled. While the insulation in each such region is in its embrittled state, it is subjected to pressure which fractures the insulation in that region and isolates it from the insulation in the intervals between those regions. It is to be observed that in its embrittled state, the insulation has not the properties of toughness, stretchability, tackiness and like characteristics possessed by it at normal room temperatures and so may be readily stripped from the wire even when not shattered by impact of the tools 10–12. Moreover, it is to be observed that the fracturing tools 11 and 12 need never so closely approach the perimeter of the conductor C that there is any likelihood of mutilating its surface.

Leads L prepared in accordance with the method described, each have exposed terminal ends $T_L$, $T_U$ which are unmutilated and are completely free of any remnant insulation. Thus such leads are well-suited to provide mechanically strong and low resistance electrical connections between circuit components by soldering or other connection techniques.

In the method above described, each successive terminal region of insulation is embrittled while at the lead cutting and stripping station S. In the alternative method shown in Figs. 6–9, each terminal insulation region is embrittled before it arrives at station S and specifically while such region is at rest and at a distance from station S corresponding with one or more lengths of lead L. Referring to Fig. 6, the wire W is in the same position as Fig. 1; i.e. in the position corresponding with the end of its feed through station S. However, the terminal region R of the wire between the tools 11—12 is already in embrittled state as will appear from the following description. So far as the actuation of the tools 10–14 is concerned, Figs. 6–9 respectively correspond with Figs. 1, 3, 4 and 5 above described.

The series of Figs. 6–9 includes no figure like Fig. 2 which requires a dwell between the completion of the wire-feeding stroke and the actuation of the tools at the station S. In the method of Figs. 6–9, the "in" stroke of the tools 10–12 may begin immediately upon completion of the tools of the wire feeding. In the interval during which the tools 10–12 are moving inwardly to sever the wire and to fracture the embrittled region R, the nozzle 13 is directing a stream of refrigerant to a succeeding region $R_1$ (Fig. 7) of the insulation on the uncut wire. Thus the interval during which the uncut wire must be at rest between its successive feeding movements to allow time for the operation of the tools 10–12 is utilized for embrittlement of the next terminal region to be operated upon by them. Thus for any required freezing interval of time, the method of Figs. 6–9 provides a shorter overall cycle time. Again for economy of refrigerant and in avoidance of embrittlement of insulation outside of the spaced terminal regions the discharge from nozzle 13 may be controlled so as be cut off except for a period while the wire W is at rest and the tools 10–12 moving to the position shown in Fig. 7. In other respects the methods of Figs. 6–9 are similar to that of Figs. 1–5 and description thereof need not be further expanded upon.

It has been determined that exposing the insulation to such low temperatures does not permanently affect its normal characteristics which are restored in a short time. Hence it is not necessary critically to localize the application of refrigerant so that the embrittled regions closely correspond with the extent of insulation to be removed. However, it is not feasible to bring the wire at its source to such low temperatures because of the difficulty of feeding the wire without fracturing the insulation as it passes over the sheaves or is held by the feeding grippers of the usual feeding mechanisms. For such reason, and since the embrittlement is transitory, the refrigerant should be applied only to spaced terminal regions of the wire and while such regions are at or immediately adjacent the lead cutting and stripping station.

Although the method can be best utilized to effect in high-speed cutting and stripping machines, such as exemplified by my aforesaid patent, it is to be understood that it can be performed by other machines or can be performed by hand. For example, the nozzle 13 may be held by an operator and directed to a region of the insulation including an intermediate point at which point the wire is to be cut by hand pliers. Before such cutting operation, the embrittled region can be hit by the pliers, hammer or other tool on either side of the point at which the cut is to be made. Any fractured insulation remaining on the wire after it is cut can then be easily removed by the pliers with little or no danger of mutilating the exposed terminal portions $T_U$, $T_L$ of the lead.

What is claimed is:

1. A method of forming insulated leads with exposed conductor ends from a continuous length of wire covered with cold-hardenable insulation which comprises intermittently feeding the wire sequentially to advance spaced unbent regions thereof to a conductor-severing and insulation-stripping station, sequentially exposing said spaced unbent regions of the wire to a stream of refrigerant at temperatures in the range of from about −100° F. to −300° F. temporarily to effect localized embrittlement of the wire insulation in said regions, and at said station performing the steps of applying pressure to the embrittled insulation of each sequentially advanced region of the wire to fracture said embrittled insulation, of severing the wire intermediate the ends of the region, and of stripping any remnant fractured insulation from the severed end portions of the wire, said steps being repeated at said station upon each sequentially advanced region of the wire to produce a series of insulated leads each having both of its terminal conductor portions cleanly stripped of insulation and free of mutilation.

2. A method of forming insulated leads with exposed conductor ends from a continuous length of wire covered with cold-hardenable insulation which comprises intermittently feeding the wire sequentially to advance spaced unbent regions thereof to a conductor-severing and insulation-stripping station, and at said station performing the steps of sequentially exposing said spaced unbent regions of the insulated wire to a stream of refrigerant at temperatures in the range from about −100° F. to −300° F. to effect localized embrittlement of the insulation in said regions, of applying pressure to the embrittled insulation of each sequentially advanced region of the wire to fracture said embrittled insulation, of severing the wire intermediate the ends of the region, and of stripping any remnant fractured insulation from the severed end portions of the wire, said steps being repeated at said station upon each sequentially advanced region of the wire to produce a series of insulated leads each having both of its terminal conductor portions cleanly stripped of insulation and free of mutilation.

3. A method of forming insulated leads with exposed conductor ends from a continuous length of wire covered with cold-hardenable insulation which comprises intermittently feeding the wire sequentially to advanced spaced unbent regions thereof to a conductor-severing and insulation-stripping station, in advance of said station sequentially exposing said spaced unbent regions of the insulated wire to a stream of refrigerant at temperatures in the range of from about −100° F. to −300° F. temporarily to effect localized embrittlement of the insulation in said regions, and at said station performing the steps of applying pressure to the embrittled region of each sequentially advanced region of the wire to fracture said embrittled insulation, of severing the wire intermediate the ends of the region, and of stripping any remnant fractured insulation from the severed end portions of the wire, said steps being repeated at said station upon each sequentially advanced region of the wire to produce a series of insulated leads each having both of its terminal conductor portions cleanly stripped of insulation and free of mutilation.

4. In an apparatus for forming insulated leads with stripped ends from a continuous length of wire covered with cold-hardenable insulation, means for cutting through the wire at distances each corresponding with the length of individual leads, means for exerting pressure on said insulation on opposite sides of said cutting means at distances corresponding with the desired length of said stripped ends of the leads, and means including nozzle structure for supplying refrigerant to effect localized embrittlement of the insulation in spaced unbent regions successively subsequently engaged by said pressure-applying means and said cutting means.

References Cited in the file of this patent

UNITED STATES PATENTS

| | | |
|---|---|---|
| 1,753,561 | Emmert | Apr. 8, 1930 |
| 2,083,407 | Scrantom | June 8, 1937 |
| 2,854,360 | Pajes | Sept. 30, 1958 |